US00RE50620E

(19) United States
(12) Reissued Patent
Choi et al.

(10) Patent Number: US RE50,620 E
(45) Date of Reissued Patent: Oct. 7, 2025

(54) BATTERY MODULE, BATTERY PACK INCLUDING BATTERY MODULE, AND VEHICLE INCLUDING BATTERY PACK

(71) Applicant: LG ENERGY SOLUTION, LTD., Seoul (KR)

(72) Inventors: Mi-Geum Choi, Daejeon (KR); Jeong-O Mun, Daejeon (KR); Yoon-Koo Lee, Daejeon (KR); Dal-Mo Kang, Daejeon (KR)

(73) Assignee: LG ENERGY SOLUTION, LTD., Seoul (KR)

(21) Appl. No.: 18/137,346

(22) Filed: Apr. 20, 2023

Related U.S. Patent Documents

Reissue of:
(64) Patent No.: 10,981,454
Issued: Apr. 20, 2021
Appl. No.: 16/064,196
PCT Filed: Jul. 28, 2017
PCT No.: PCT/KR2017/008191
§ 371 (c)(1),
(2) Date: Jun. 20, 2018
PCT Pub. No.: WO2018/066797
PCT Pub. Date: Apr. 12, 2018

(30) Foreign Application Priority Data

Oct. 6, 2016 (KR) ..... 10-2016-0129118

(51) Int. Cl.

| | |
|---|---|
| ***B60L 50/60*** | (2019.01) |
| ***H01M 10/48*** | (2006.01) |
| ***H01M 50/211*** | (2021.01) |
| ***H01M 50/50*** | (2021.01) |
| ***H01M 50/503*** | (2021.01) |

(Continued)

(52) U.S. Cl.
CPC ..... *B60L 50/60* (2019.02); *B60L 50/66* (2019.02); *H01M 10/482* (2013.01); *H01M 10/486* (2013.01); *H01M 50/211* (2021.01); *H01M 50/50* (2021.01); *H01M 50/503* (2021.01); *H01M 50/519* (2021.01);
(Continued)

(58) Field of Classification Search
None
See application file for complete search history.

(56) References Cited

U.S. PATENT DOCUMENTS

| | | | |
|---|---|---|---|
| 9,978,998 | B2 | 5/2018 | Choi et al. |
| 2011/0059342 | A1 | 3/2011 | Lee et al. |

(Continued)

FOREIGN PATENT DOCUMENTS

| | | | |
|---|---|---|---|
| CN | 102356504 | A | 2/2012 |
| CN | 102379058 | A | 3/2012 |

(Continued)

OTHER PUBLICATIONS

English Translation of KR2014/0081960 to Jun. 2014.*
International Search Report issued in PCT/KR2017/008191 (PCT/ISA/210), dated Nov. 23, 2017.

*Primary Examiner* — Lee E Sanderson
(74) *Attorney, Agent, or Firm* — Birch, Stewart, Kolasch & Birch, LLP

(57) ABSTRACT

Disclosed is a battery module, which includes a plurality of battery cells stacked one another and respectively having electrode leads protruding in the front and rear directions of the battery module, and a bus bar unit configured to integrally connect the electrode leads of the plurality of battery cells.

17 Claims, 8 Drawing Sheets

(51) Int. Cl.
*H01M 50/519* (2021.01)
*H01M 50/569* (2021.01)

(52) U.S. Cl.
CPC ..... *H01M 50/569* (2021.01); *H01M 2200/10* (2013.01); *H01M 2220/20* (2013.01); *Y02T 10/70* (2013.01)

(56) References Cited

U.S. PATENT DOCUMENTS

| | | | | |
|---|---|---|---|---|
| 2011/0070474 | A1 | 3/2011 | Lee et al. | |
| 2012/0019061 | A1* | 1/2012 | Nishihara ..... | H01M 10/482 429/7 |
| 2014/0242427 | A1 | 8/2014 | Tanaka et al. | |
| 2014/0342191 | A1 | 11/2014 | Shin et al. | |
| 2016/0240893 | A1 | 8/2016 | Lee | |
| 2017/0077562 | A1 | 3/2017 | Park et al. | |
| 2017/0125774 | A1 | 5/2017 | Choi et al. | |
| 2017/0328783 | A1 | 11/2017 | Okamoto et al. | |

FOREIGN PATENT DOCUMENTS

| | | | |
|---|---|---|---|
| EP | 2804284 | A2 | 11/2014 |
| JP | 2016-122577 | A | 7/2016 |
| JP | 2017-511963 | A | 4/2017 |
| JP | 2017-84468 | A | 5/2017 |
| KR | 10-2014-0072689 | A | 6/2014 |
| KR | 10-2014-0081960 | A | 7/2014 |
| KR | 10-2014-0095660 | A | 8/2014 |
| KR | 10-2014-0139402 | A | 12/2014 |
| KR | 10-2015-0113827 | A | 10/2015 |
| KR | 10-2015-0115253 | A | 10/2015 |

* cited by examiner

BATTERY MODULE, BATTERY PACK INCLUDING BATTERY MODULE, AND VEHICLE INCLUDING BATTERY PACK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present disclosure relates to a battery module, a battery pack including the battery module, and a vehicle including the battery pack.

The present application *is a broadening Reissue application of U.S. Pat. No. 10,981,454 issued on Apr. 20, 2021* (*U.S. patent application Ser. No. 16/064,196 filed on Jun. 20, 2018*) *which* claims priority to Korean Patent Application No. 10-2016-0129118 filed on Oct. 6, 2016 in the Republic of Korea, the [disclosures] *entire contents* of which are *hereby expressly* incorporated [herein] by reference *into the present application*.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.2V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components.

A conventional battery module includes a plurality of battery cells stacked one another and having electrode leads protruding in the front and rear directions, a pair of bus bars mounted at the front and rear of the plurality of battery cells and electrically connected to the electrode leads, a pair of bus bar frames covering the pair of bus bars, and a sensing bus bar for connecting the pair of bus bars.

Seeing the assembling process of the conventional battery module, if the plurality of battery cells are stacked completely, first, the pair of bus bars are electrically connected to the electrode leads protruding in the front and rear directions at the front and rear of the battery cells. After that, the pair of bus bar frames are mounted to cover the pair of bus bars, and finally, the sensing bus bar is mounted to connect the pair of bus bars for the purpose of voltage sensing.

However, in the conventional battery module, the pair of bus bars, the pair of bus bar frames and the sensing bus bar are individually mounted, which increases the time required for the assembling process.

In addition, in the conventional battery module, when the components are assembled individually, the individual components may be erroneously assembled in the assembling direction, and the manufacture cost is increased since the individual components need individual molds and individually packaging.

As a result, in the conventional battery module, since the components for connecting and sensing the bus bars are individually separated, the assembling process of the battery module has bad efficiency.

Thus, it is demanded to develop a battery module with improved assembling efficiency, a battery pack including the battery module, and a vehicle including the battery pack.

DISCLOSURE

Technical Problem

The present disclosure is designed to solve the problems of the related art, and therefore the present disclosure is directed to providing a battery module with improved assembling efficiency, a battery pack including the battery module, and a vehicle including the battery pack.

Technical Solution

In one aspect of the present disclosure, there is provided a battery module, comprising: a plurality of battery cells stacked one another and respectively having electrode leads protruding in the front and rear directions of the battery module; and a bus bar unit configured to integrally connect the electrode leads of the plurality of battery cells.

The bus bar unit may include: a first bus bar frame mounted in front of the plurality of battery cells; a first bus bar coupled to the first bus bar frame and connected to the electrode leads of the plurality of battery cells, which protrude to the front; a second bus bar frame mounted behind the plurality of battery cells; a second bus bar coupled to the second bus bar frame and connected to the electrode leads of the plurality of battery cells, which protrude to the rear; and a sensing bus bar configured to electrically connect the second bus bar and the first bus bar and integrally mounted to the first bus bar and the second bus bar.

The sensing bus bar may include an elastic bending portion which is elastically bendable in the front and rear directions of the plurality of battery cells.

The elastic bending portion may be bent in at least two stages when being mounted to the first bus bar frame and the second bus bar frame toward the plurality of battery cells.

When any one of the first bus bar frame and the second bus bar frame is mounted to the plurality of battery cells, the other one of the first bus bar frame and the second bus bar frame may be slidably mounted in the front and rear directions of the plurality of battery cells.

The battery module may further comprise a reinforcing plate provided between the first bus bar frame and the second bus bar frame to cover one surface of the plurality of battery cells.

Each of the first bus bar frame and the second bus bar frame may include: a bus bar mounting portion to which the first bus bar or the second bus bar is mounted; and a cell covering portion bent from the bus bar mounting portion to cover one surface of the plurality of battery cells along the front and rear directions.

The cell covering portion of the first bus bar frame and the cell covering portion of the second bus bar frame may be shaped to correspond to each other in the front and rear directions of the plurality of battery cells.

When any one of the first bus bar frame and the second bus bar frame is slidably mounted, the cell covering portion of the first bus bar frame and the cell covering portion of the second bus bar frame may be engaged with each other to cover one surface of the plurality of battery cells.

The sensing bus bar may be any one selected from a flexible circuit board, a flexible flat cable and a wire.

A thermistor may be integrally mounted to the sensing bus bar.

The first bus bar frame, the first bus bar, the second bus bar frame, the second bus bar and the sensing bus bar may be integrally coupled to each other before being mounted to the plurality of battery cells.

In addition, the present disclosure provides a battery pack, comprising: at least one battery module according to the above embodiments; and a pack case configured to package the at least one battery module.

Moreover, the present disclosure provides a vehicle comprising: at least one battery pack according to the above embodiment.

Advantageous Effects

According to the various embodiments as above, it is possible to provide a battery module with improved assembling efficiency, a battery pack including the battery module, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
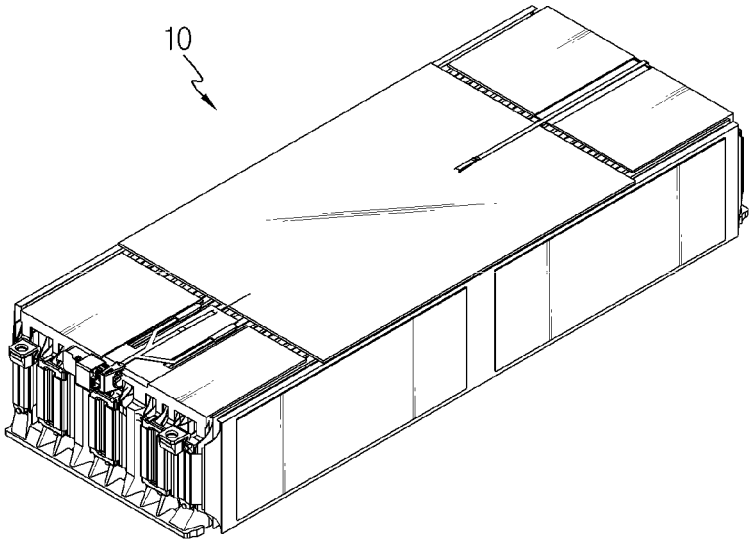
FIG. 1 is a diagram for illustrating a battery module according to an embodiment of the present disclosure.
Figure 2:
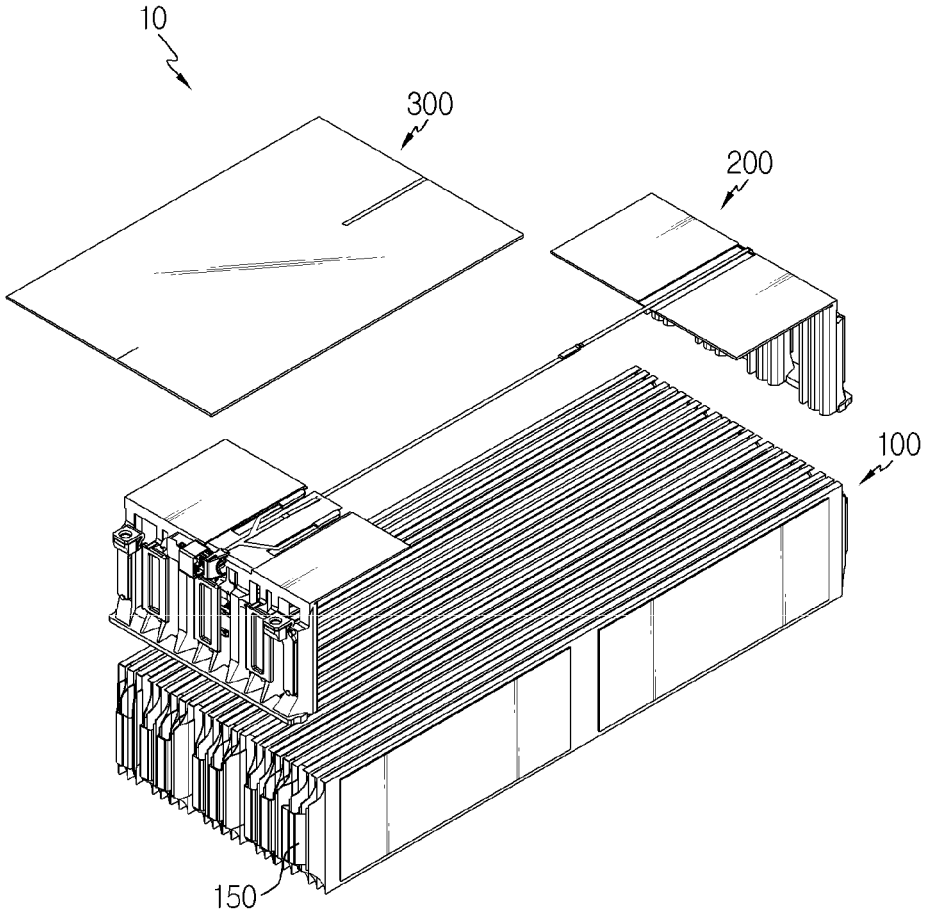
FIG. 2 is an exploded perspective view showing the battery module of FIG. 1.
Figure 3:
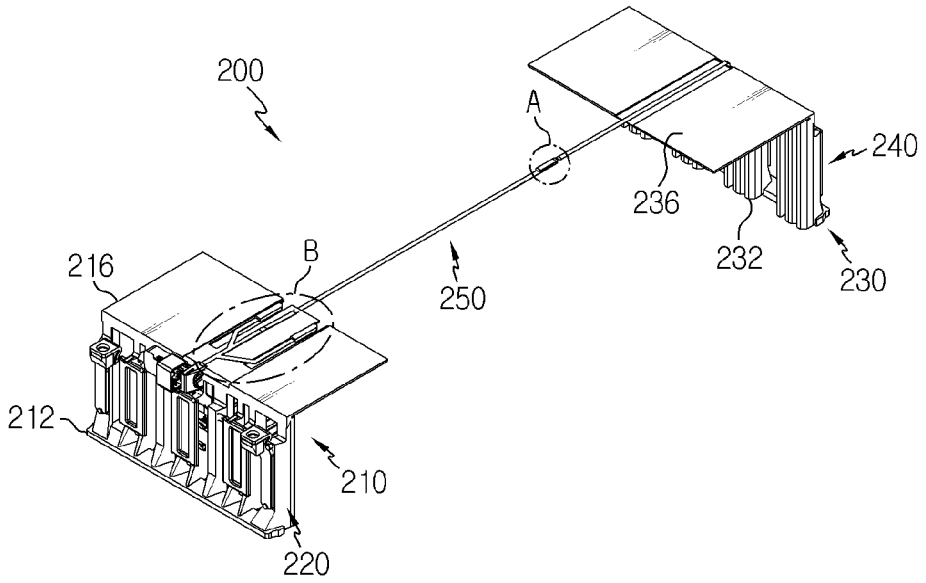
FIG. 3 is a diagram for illustrating a bus bar unit of the battery module of FIG. 2.
Figure 4:
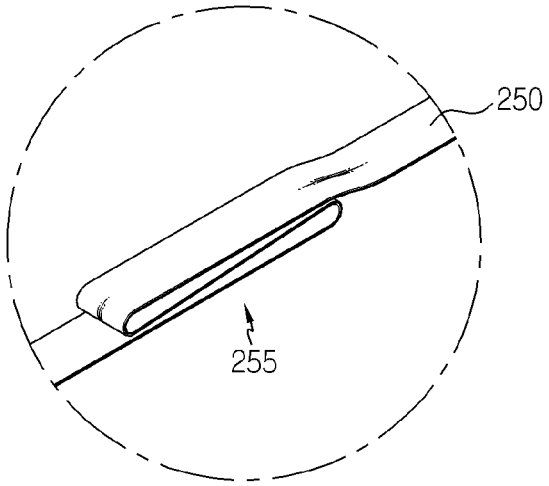
FIG. 4 is an enlarged view showing a portion A of the bus bar unit of FIG. 3.
Figure 5:
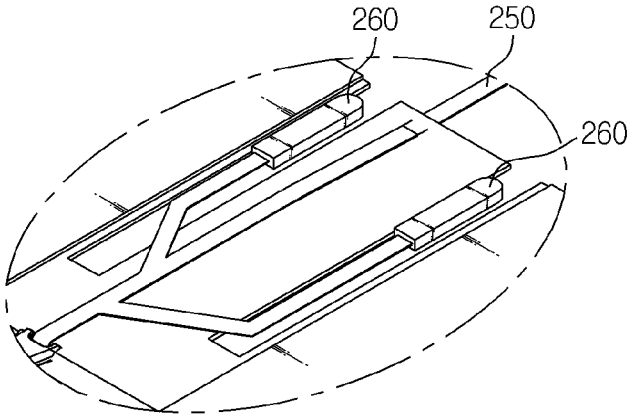
FIG. 5 is an enlarged view showing a portion B of the bus bar unit of FIG. 3.

FIG. 1 is a diagram for illustrating a battery module according to an embodiment of the present disclosure, FIG. 2 is an exploded perspective view showing the battery module of FIG. 1, FIG. 3 is a diagram for illustrating a bus bar unit of the battery module of FIG. 2, FIG. 4 is an enlarged view showing a portion A of the bus bar unit of FIG. 3, and FIG. 5 is an enlarged view showing a portion B of the bus bar unit of FIG. 3.

Referring to FIGS. 1 to 5, the battery module 10 may include a battery cell 100, a bus bar unit 200 and a reinforcing plate 300.

The battery cell 100 is a secondary battery, which may be a pouch-type secondary battery. The battery cell 100 may be provided in plural, and the plurality of battery cells 100 may be stacked one another to be electrically connected to each other.

Each of the plurality of battery cells 100 may include an electrode assembly, a battery case and an electrode lead 150.

The electrode assembly may include a positive electrode plate, a negative electrode plate, a separator and the like. The electrode assembly is well known in the art and thus is not described in detail here. The battery case is used for packaging the electrode assembly and may be made of a laminate sheet containing a resin layer and a metal layer.

The electrode lead 150 may be electrically connected to the electrode assembly. The electrode lead 150 may be provided in a pair. The pair of electrode leads may partially protrude in the front and rear directions of the battery module 10.

The bus bar unit 200 may electrically connect the electrode leads 150 of the plurality of battery cells 100 and sense voltages of the plurality of battery cells 100. Here, the bus bar unit 200 may be a single unit integrally assembled and integrally connect the electrode leads 150 of the plurality of battery cells 100.

Seeing the bus bar unit 200 in more detail, the bus bar unit 200 may include a first bus bar frame 210, a first bus bar 220, a second bus bar frame 230, a second bus bar 240, a sensing bus bar 250 and a thermistor 260.

The first bus bar frame 210 may be mounted in front of the plurality of battery cells 100 and cover the front side of the plurality of battery cells 100. The first bus bar frame 210 may include a bus bar mounting portion 212 and a cell covering portion 216.

The bus bar mounting portion 212 may be disposed at the front of the plurality of battery cells 100. The first bus bar 220, explained later, may be mounted to the bus bar mounting portion 212.

The cell covering portion 216 is formed to be bent from the bus bar mounting portion 212 and may cover a part of one surface of the plurality of battery cells 100 in the front and rear directions, in more detail a part of an upper surface of the plurality of battery cells 100.

The first bus bar 220 is coupled to the first bus bar frame 210, in more detail to the bus bar mounting portion 212 of the first bus bar frame 210, and may be electrically connected to the electrode leads 150 which protrude to the front of the plurality of battery cells 100. When being coupled to the bus bar mounting portion 212, the first bus bar 220 may be fixed to the bus bar mounting portion 212 by thermal bonding or the like.

The second bus bar frame 230 is mounted behind the plurality of battery cells 100 and may cover the rear side of the plurality of battery cells 100. The second bus bar frame 230 may include a bus bar mounting portion 232 and a cell covering portion 236.

The bus bar mounting portion 232 may be disposed at the rear of the plurality of battery cells 100. The second bus bar 240, explained later, may be mounted to the bus bar mounting portion 232.

The cell covering portion 236 is formed to be bent from the bus bar mounting portion 232 and may cover a part of one surface of the plurality of battery cells 100 in the front and rear directions, in more detail a part of an upper surface of the plurality of battery cells 100.

The second bus bar 240 is coupled to the second bus bar frame 230, in more detail to the bus bar mounting portion 232 of the second bus bar frame 230, and may be electrically coupled to the electrode leads 150 which protrude to the rear of the plurality of battery cells 100. When being coupled to the bus bar mounting portion 232, the second bus bar 240 may be fixed to the bus bar mounting portion 232 by thermal bonding or the like.

The sensing bus bar 250 may electrically connect the first bus bar 220 and the second bus bar 240 and be integrally mounted to the first bus bar 220 and the second bus bar 240, respectively.

The sensing bus bar 250 may be any one selected from a flexible circuit board, a flexible flat cable and a wire and be disposed at the upper side of the plurality of battery cells 100.

An elastic bending portion 255 may be provided at the sensing bus bar 250.

The elastic bending portion 255 is provided at one side of the sensing bus bar 250 in the length direction and may be elastically bendable along the front and rear directions of the plurality of battery cells 100.

As the elastic bending portion 255 is bent, the length of the sensing bus bar 250 may be shortened in the front and rear directions of the plurality of battery cells 100.

When the first bus bar frame 210 and the second bus bar frame 230 of the bus bar unit 200 are mounted to the plurality of battery cells 100, the elastic bending portion 255 may be bent in at least two stages.

The elastic bending portion 255 will be described in more detail in association with the sensing bus bar 250. Before being mounted to the upper side of the plurality of battery cells 100, the sensing bus bar 250 may be formed longer than the length of the plurality of battery cells 100 in the front and rear directions. This allows the first bus bar frame 210 and the second bus bar frame 230 to be mounted to the plurality of battery cells 100 more easily.

After that, if any one of the first bus bar frame 210 and the second bus bar frame 230 is completely mounted, the elastic bending portion 255 may be bent so that the length of the sensing bus bar 250 corresponds to the length of the plurality of battery cells 100 in the front and rear directions. This allows the other bus bar frame, not yet completely mounted, to be mounted easily. This will be explained in more detail later with reference to FIGS. 6 to 11 which depict a process of assembling the bus bar unit 200 of the battery module 10.

The thermistor 260 is a temperature sensor capable of detecting the temperature of the plurality of battery cells 100 and may be integrally mounted to the sensing bus bar 250. The thermistor 260 may be provided in a pair and integrally coupled to the sensing bus bar 250, respectively.

The reinforcing plate 300 is provided between the first bus bar frame 210 and the second bus bar frame 230 and may cover one surface of the plurality of battery cells 100, in more detail an upper surface of the plurality of battery cells 100 between the first bus bar frame 210 and the second bus bar frame 230.

The reinforcing plate 300 covers a region of the plurality of battery cells 100 which is not covered, and may support the plurality of battery cells 100 and give a buffering action against impacts or the like.

Hereinafter, a process of assembling the battery module 10 according to this embodiment, in more detail a process of assembling the bus bar unit 200, will be described in more detail.

FIGS. 6 to 11 are diagrams for illustrating a process of assembling the bus bar unit of the battery module of FIG. 1

Figure 6:
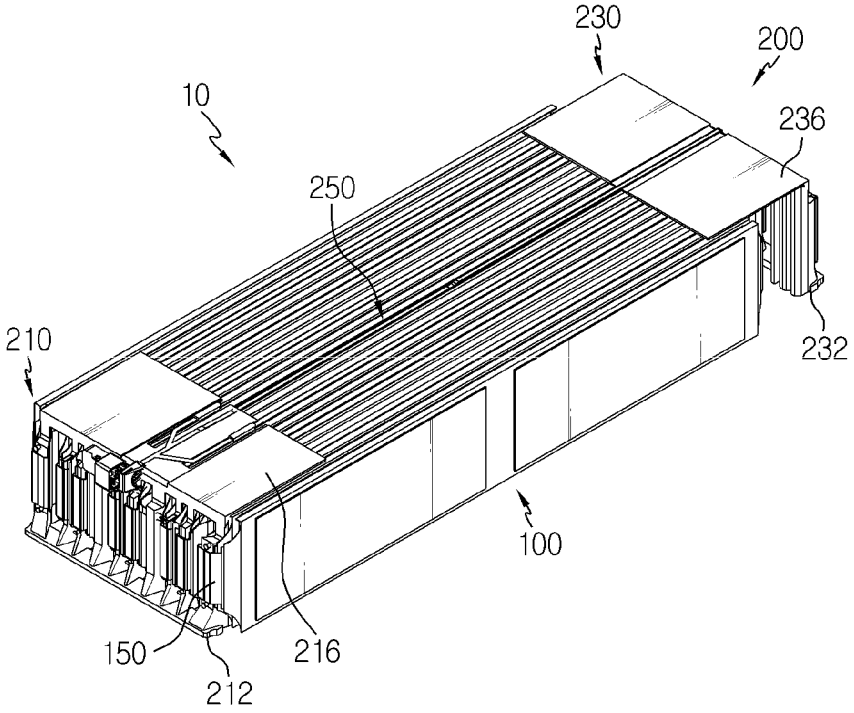
FIGS. 6 to 11 are diagrams for illustrating a process of assembling the bus bar unit of the battery module of FIG. 1
Figure 7:
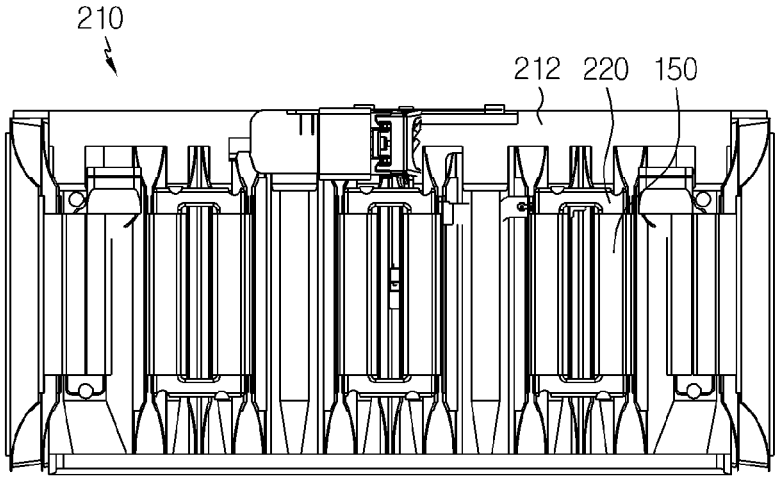
Figure 8:
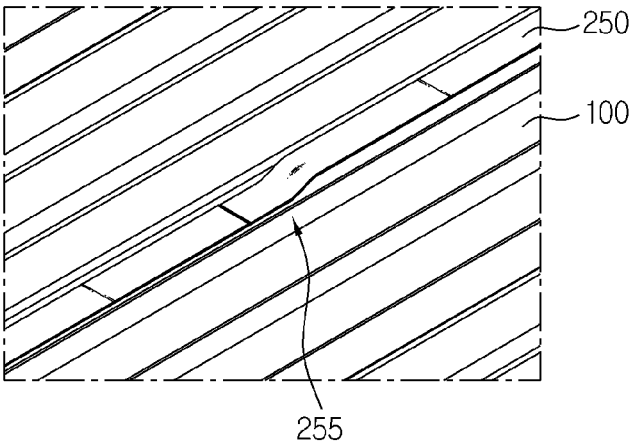

Referring to FIGS. 6 to 8, if the battery cells 100 are stacked completely, the bus bar unit 200 may be mounted to the plurality of battery cells 100. Here, the first bus bar frame 210, the first bus bar 220, the second bus bar frame 230, the second bus bar 240, the sensing bus bar 250 and the thermistor 260 of the bus bar unit 200 may be coupled to each other to form an integrated module unit, before being mounted to the plurality of battery cells 100. In other words, the bus bar unit 200 may be prepared as an integrated module in advance, without preparing the components individually.

Accordingly, in this embodiment, the time required for the assembling process may be shortened, compared with the conventional structure where individual components are prepared and mounted individually for connecting and sensing the bus bars of the battery cells 100.

In addition, in this embodiment, since the bus bar unit 200 is provided as an integrated module, the possibility of erroneous assembling in the assembling direction, caused by individual assembling of individual components, may be significantly lowered. In addition, since it is not needed to apply individual molds for individual components and package individual components, the manufacturing cost may be greatly reduced.

The process of mounting the bus bar unit 200 to the plurality of battery cells 100 will be described in more detail. First, any one of the first bus bar frame 210 and the second bus bar frame 230 of the bus bar unit 200 may be mounted to the front or rear of the plurality of battery cells 100.

For example, the first bus bar frame 210 of the bus bar unit 200 may be mounted to the front of the plurality of battery cells 100 firstly. At this time, the first bus bar 220 may be connected to the electrode leads 150 which protrude to the front of the plurality of battery cells 100. Meanwhile, here, the elastic bending portion 255 of the sensing bus bar 250 may be disposed without being bent in at least two stages.

By disposing the elastic bending portion 255 in this way, the total length of the sensing bus bar 250 may be longer than the length of the plurality of battery cells 100 in the front and rear directions. Accordingly, the second bus bar frame 230 may be disposed to be spaced apart from the rear side of the plurality of battery cells 100 without interfering with the rear surface of the plurality of battery cells 100 or the electrode leads 150.

Thus, when the first bus bar frame 210 is being mounted, it is possible to prevent erroneous assembling, caused by the interference of the second bus bar frame 230 at the rear of the plurality of battery cells 100.

Figure 9:
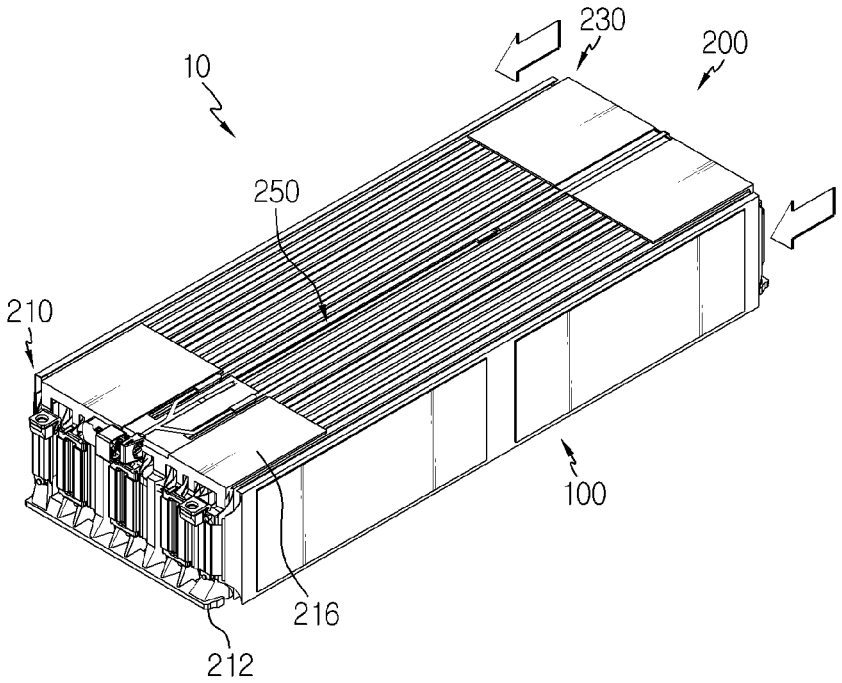
Figure 10:
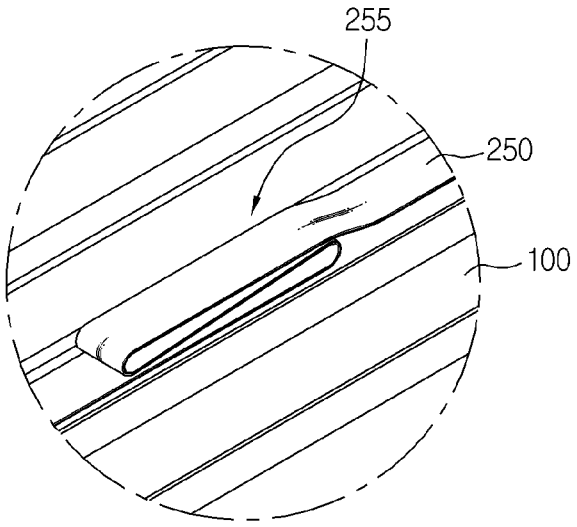

Referring to FIGS. 9 and 10, if any one of the first bus bar frame 210 and the second bus bar frame 230 is mounted to the plurality of battery cells 100, the other one of the first bus bar frame 210 and the second bus bar frame 230 may be slidably mounted along the front and rear directions of the plurality of battery cells 100.

For example, if the first bus bar frame 210 is mounted to the plurality of battery cells 100, the second bus bar frame 230 may slide in the front direction of the battery cells 100.

As the second bus bar frame 230 slides in this way, the elastic bending portion 255 of the sensing bus bar 250 may elastically bent to reduce the total length of the sensing bus bar 250 in the front and rear directions of the battery cells 100.

Here, if the length of the sensing bus bar 250 is reduced, the second bus bar frame 230 may be closely adhered to the rear side of the plurality of battery cells 100, and the second bus bar 240 may be electrically connected to the electrode leads 150 which protrude to the rear of the plurality of battery cells 100.

By such a simple sliding operation, the bus bar unit 200 may integrally connect the electrode leads 150 of the plurality of battery cells 100 and perform connection for voltage sensing at the same time.

Figure 11:
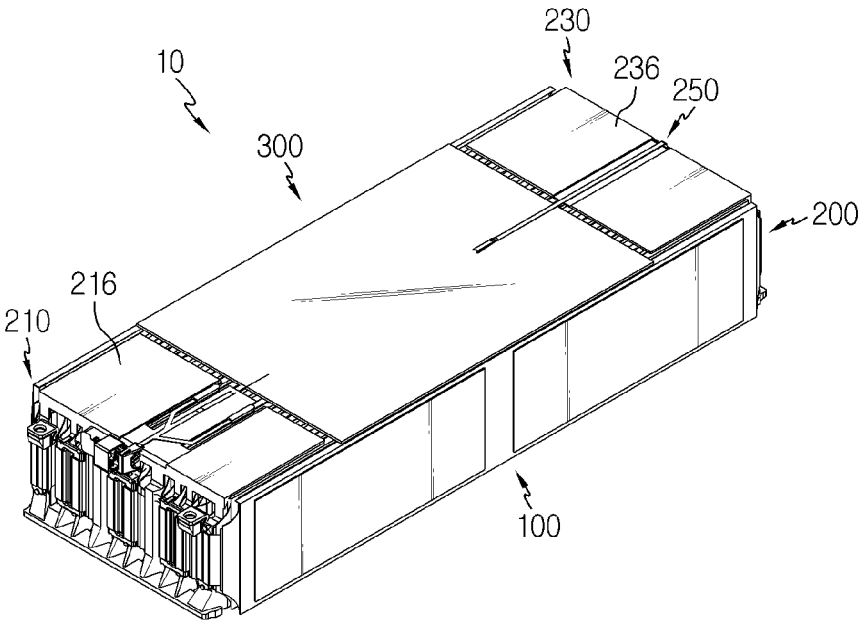

Referring to FIG. 11, if the bus bar unit 200 is mounted completely, the reinforcing plate 300 may cover the upper surface of the plurality of battery cells 100 between the first bus bar frame 210 and the second bus bar frame 230 of the bus bar unit 200.

As described above, the battery module 10 of this embodiment may greatly improve the assembling efficiency of the battery module 10 by using the bus bar unit 200 which is prepared as an integrated module.

Figure 12:
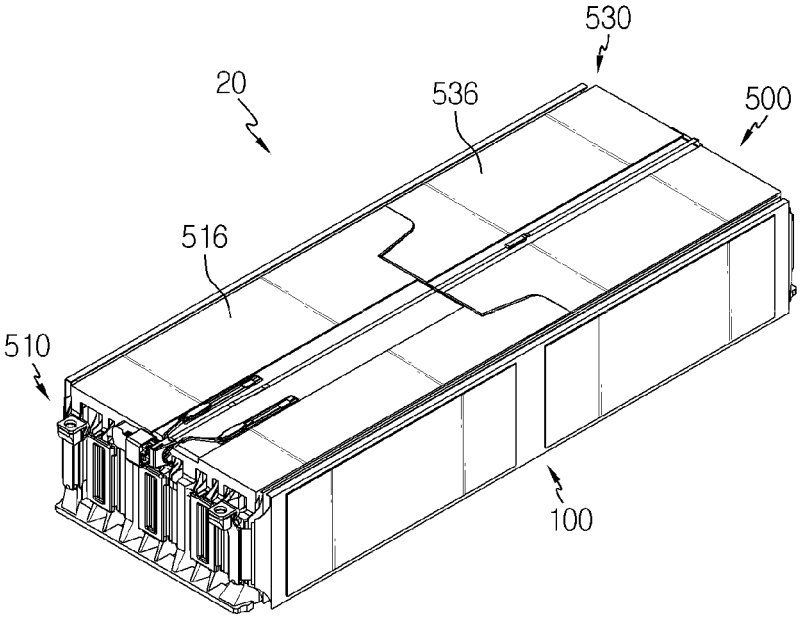
FIG. 12 is a diagram for illustrating a battery module according to another embodiment of the present disclosure.
Figure 13:
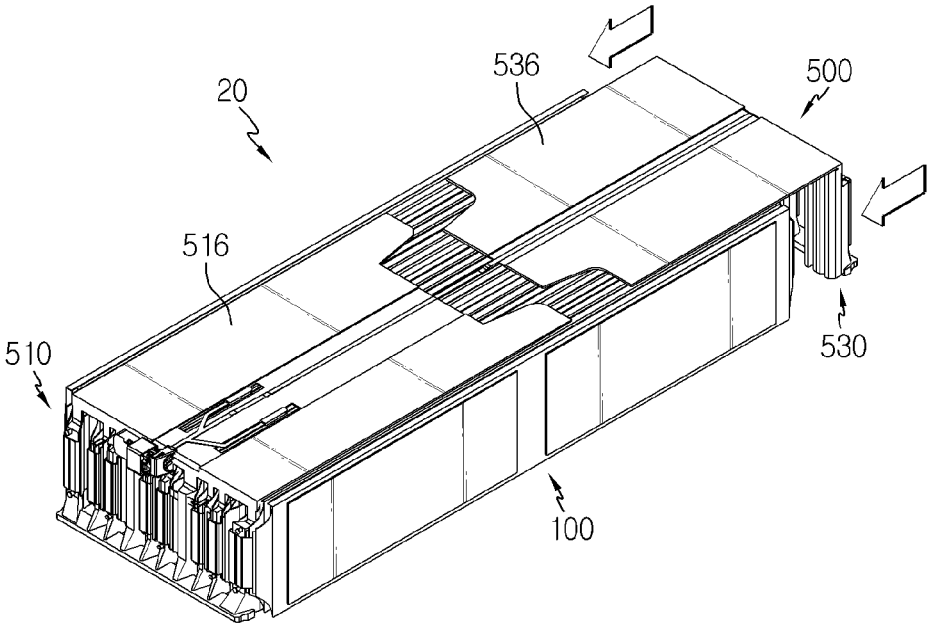
FIG. 13 is a diagram for illustrating a process of assembling the bus bar unit of the battery module of FIG. 12.

FIG. 12 is a diagram for illustrating a battery module according to another embodiment of the present disclosure, and FIG. 13 is a diagram for illustrating a process of assembling the bus bar unit of the battery module of FIG. 12.

Referring to FIGS. 12 and 13, the battery module 20 may include the plurality of battery cells 100 and a bus bar unit 500.

The bus bar unit 500 is similar to the bus bar unit 200 of the former embodiment, and thus its features different from those of the bus bar unit 200 will be described in detail.

In the bus bar unit 500, a cell covering portion 516 of a first bus bar frame 510 and a cell covering portion 536 of a second bus bar frame 530 may be shaped to correspond to each other in the front and rear directions of the plurality of battery cells 100.

In detail, when any one of the first bus bar frame 510 and the second bus bar frame 530 is slidably mounted, the cell covering portion 516 of the first bus bar frame 510 and the cell covering portion 536 of the second bus bar frame 530 may be engaged with each other to cover one surface of the plurality of battery cells 100, in more detail the upper surface of the plurality of battery cells 100, entirely.

As described above, the battery module 20 of this embodiment may cover the upper surface of the plurality of battery cells 100 entirely by means of the first bus bar frame 510 and the second bus bar frame 530 which are engaged with each other, without using the reinforcing plate 300 of the former embodiment.

Thus, the battery module 20 of this embodiment does not demand a separate reinforcing plate, different from the former embodiment, and thus it is possible to reduce the manufacture cost of the battery module 20 further and improve the assembling efficiency further.

Figure 14:
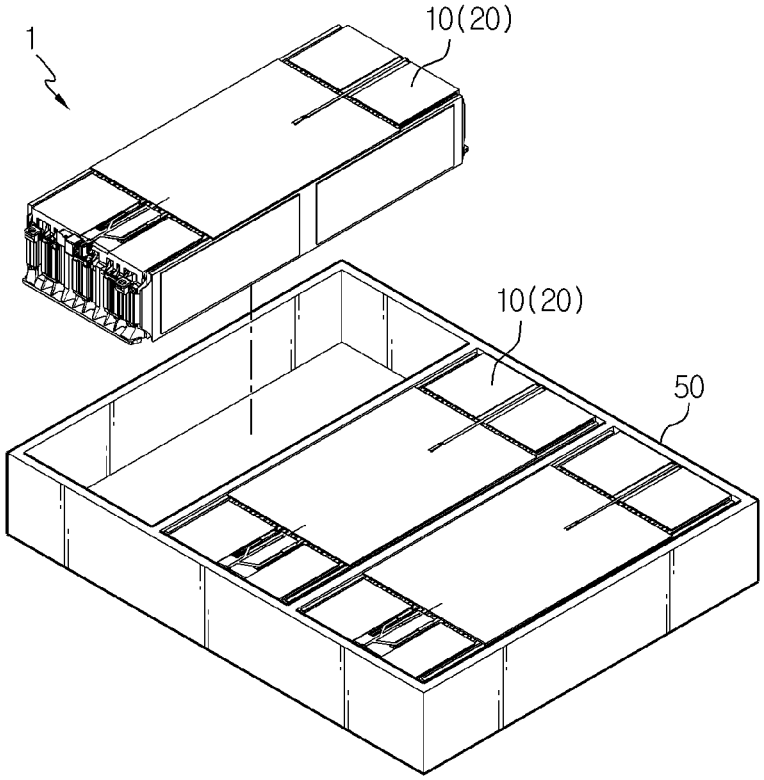
FIG. 14 is a diagram for illustrating a battery pack according to an embodiment of the present disclosure.

FIG. 14 is a diagram for illustrating a battery pack according to an embodiment of the present disclosure.

Referring to FIG. 14, a battery pack 1 may include at least one battery module 10, 20 according to the former embodiment and a pack case 50 for packaging the at least one battery module 10, 20.

The battery pack 1 may be provided to a vehicle as a fuel source of the vehicle. As an example, the battery pack 1 may be provided to an electric vehicle, a hybrid vehicle, and various other-type vehicles capable of using the battery pack 1 as a fuel source. In addition, the battery pack 1 may be provided in other devices, instruments or facilities such as an energy storage system using a secondary battery, in addition to the vehicle.

As described above, the battery pack 1 of this embodiment and devices, instruments or facilities such as a vehicle, which have the battery pack 1, include the battery module 10, 20 as described above, and thus it is possible to implement a battery pack 1 having all the advantages of the battery module 10, 20 described above, or devices, instruments, facilities or the like such as a vehicle, which have the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:

a plurality of battery cells stacked [one] *on* another and respectively having electrode leads protruding [in the front and rear directions of the battery module] *at a first end and a second end of the plurality of battery cells, the first end being opposite from the second end*; and a bus bar unit configured to [integrally connect] *electrically connect* the electrode leads of the plurality of battery cells, wherein the bus bar unit includes:

a first bus bar frame [mounted in front of] *on a first side of* the [pluarality of] battery [cells] *module*;

a first bus bar coupled to the first bus bar frame and *electrically* connected to the electrode leads of the plurality of battery cells, which protrude to [the front] *the first side of the battery module*;

a second bus bar frame [mounted behind] *on a second side of* the [plurality of] battery [cells] *module*;

a second bus bar coupled to the second bus bar frame and *electrically* connected to the electrode leads of the plurality of battery cells, which protrude to [the rear] *the second side of the battery module*; and a sensing bus bar configured to electrically connect the second bus bar and the first bus bar and [integrally mounted to] *contacting* the first bus bar and the second bus bar, wherein the sensing bus bar includes an elastic bending portion [which is configured to be elastically bendable and] *that is elastically bendable and is* folded in [ the front and rear] *first and second* directions of the [plurality of] battery [cells] *module*, wherein the sensing bus bar has a total length that is longer than a length of the [ plurality of] battery [cells] *module* in the [front and rear] *first and second* direction of the [plurality of] battery [cells] *module*, [and]

wherein the sensing bus bar including the elastic bending portion that is folded has a shorter length between the first and second bus bars that corresponds to the length of the [plurality of] battery [cells] *module* in the [front and rear] *first and second* directions of the [plurality of] battery [ cells] *module* when the bus bar unit is [integrally] *electrically* connected to the electrode leads of the plurality of battery cells, *and*

*wherein the elastic bending portion has at least one fold that overlaps the sensing bus bar.*

2. The battery module according to claim 1, wherein the elastic bending portion is bent in at least two stages when [being mounted] *coupled* to the first bus bar frame and the second bus bar frame toward the plurality of battery cells.

3. The battery module according to claim 1, *wherein* when any one of the first bus bar frame and the second bus bar frame is mounted to the plurality of battery cells, the other one of the first bus bar frame and the second bus bar frame is [slidably mounted] *attached* in the [front and rear] *first and second* directions of the [plurality of] battery [ cells] *module*.

4. The battery module according to claim 3, further comprising:

a reinforcing plate provided between the first bus bar frame and the second bus bar frame to cover one surface of the plurality of battery cells.

5. The battery module according to claim 3, wherein each of the first bus bar frame and the second bus bar frame includes:

a bus bar mounting portion to which the first bus bar or the second bus bar is mounted; and a cell covering portion bent from the bus bar mounting portion to cover one surface of the plurality of battery cells along the [front and rear] *first and second* directions *of the battery module*.

6. The battery module according to claim 5, wherein the cell covering portion of the first bus bar frame and the cell covering portion of the second bus bar frame are shaped to correspond to each other in the [front and rear] *first and second* directions of the [ plurality of] battery [cells] *module*.

7. The battery module according to claim 6, wherein when any one of the first bus bar frame and the second bus bar frame is [slidably] mounted, the cell covering portion of the first bus bar frame and the cell covering portion of the second bus bar frame are engaged with each other to cover one surface of the plurality of battery cells.

8. The battery module according to claim 1, wherein the sensing bus bar is any one selected from a flexible circuit board, a flexible flat cable and a wire.

9. The battery module according to claim 1, wherein a thermistor is [integrally] mounted to the sensing bus bar.

10. The battery module according to [claim 1] *claim 3*, wherein the first bus bar frame, the first bus bar, the second bus bar frame, the second bus bar and the sensing bus bar are [integrally] coupled to each other before being [mounted] *attached* to the plurality of battery cells.

11. A battery pack, comprising:

at least one battery module defined in claim 1; and a pack case configured to package the at least one battery module.

12. A vehicle, comprising:

at least one battery pack defined in claim 11.

13. The battery module according to claim 1, wherein the shorter length of the sensing bus bar between the first and second bus bars that corresponds to the length of the [plurality of] battery [cells] *module* in the [front and rear] *first and second* directions of the [plurality of] battery [ cells] *module* is less than the total length of the sensing bus bar.

14. The battery module according to claim 1, wherein a distance between the first and second bus bars when the bus bar unit is [integrally] *electrically* connected to the electrode leads of the plurality of battery cells is shorter than the total length of the sensing bus bar.

*15. The battery module according to claim 1, wherein the first and second directions are parallel but opposite directions from each other.*

*16. A battery module, comprising:*

*a plurality of battery cells stacked on another and respectively having electrode leads at a first end and a second end, the first end being opposite from the second end; and*

*a bus bar unit configured to electrically connect the electrode leads,*

*wherein the bus bar unit includes:*

*a first bus bar coupled to a first bus bar frame and a second bus bar coupled to a second bus bar frame, the first bus bar and the second bus bar being spaced apart from each other; and*

*a sensing bus bar having a length in front and rear directions of the battery module and configured to electrically connect the first bus bar and the second bus bar,*

*wherein the sensing bus bar includes an elastic bending portion that is folded in the front and rear directions of the battery module,*

*wherein a length of the sensing bus bar is longer than a length of the plurality of battery cells, and a length of the elastic bending portion is shorter than the length of the plurality of battery cells, and*

*wherein the elastic bending portion has at least one fold that overlaps the sensing bus bar.*

*17. A battery module, comprising:*

*a plurality of battery cells stacked on another and respectively having electrode leads protruding from the plurality of battery cells at a first end and a second end, the first end being opposite from the second end; and*

*a bus bar unit configured to connect the electrode leads of the plurality of battery cells, wherein the bus bar unit includes:*

*a first bus bar coupled to a first bus bar frame and electrically connected to the electrode leads of the plurality of battery cells, which protrude to a first side of the battery module;*

*a second bus bar coupled to a second bus bar frame and electrically connected to the electrode leads of the plurality of battery cells, which protrude to a second side of the battery module; and*

*a sensing bus bar configured to electrically connect the second bus bar and the first bus bar and contacting the first bus bar and the second bus bar,*

*wherein the sensing bus bar includes an elastic bending portion that is folded in first and second directions of the battery module,*

*wherein the sensing bus bar has a total length that is longer than a length of the battery module in the first and second directions of the battery module,*

*wherein the sensing bus bar including the elastic bending portion that is folded has a shorter length between the first and second bus bars that corresponds to the length of the battery module in the first and second directions of the battery module when the bus bar unit is electrically connected to the electrode leads of the plurality of battery cells, and*

*wherein the elastic bending portion has at least one fold that overlaps the sensing bus bar.*

* * * * *